Oct. 15, 1963 A. D. SANDS 3,106,937
SAFETY CUT-OFF VALVE REQUIRING RESET BY PRESSURE EQUALIZATION
Filed Jan. 13, 1960 3 Sheets-Sheet 1
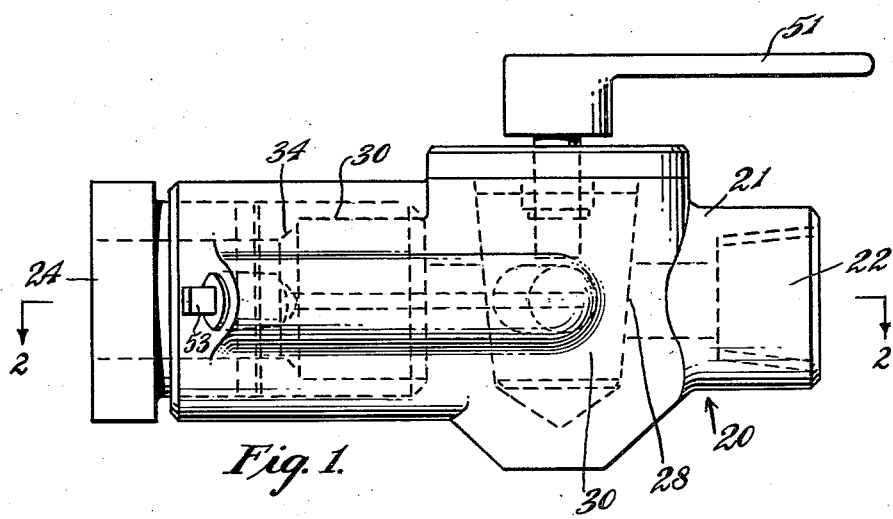
Fig. 1.
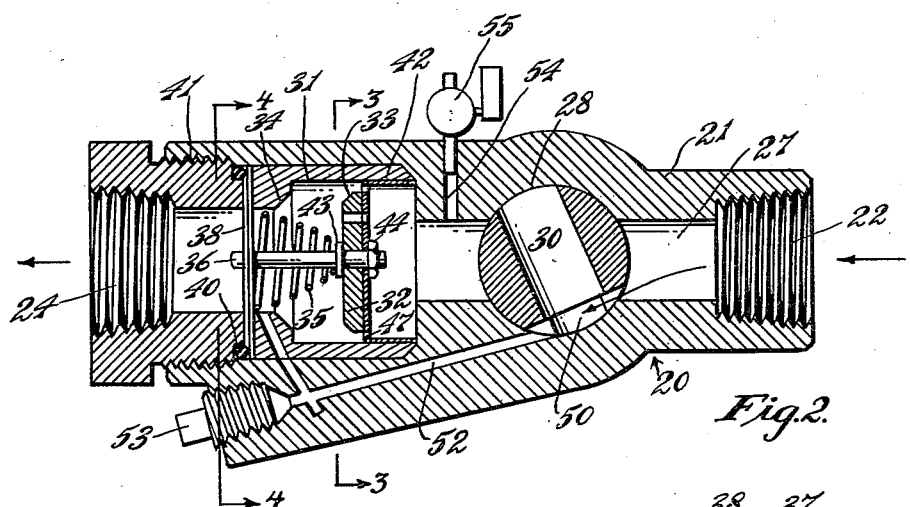
Fig. 2.
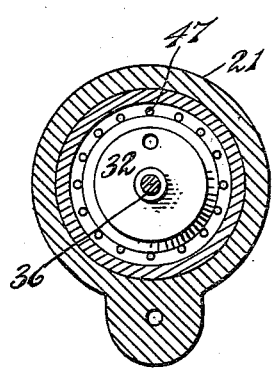
Fig. 3.
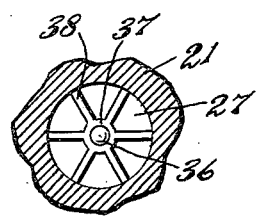
Fig. 4.
INVENTOR
Asa D. Sands
BY
ATTORNEYS Oct. 15, 1963 A. D. SANDS 3,106,937
SAFETY CUT-OFF VALVE REQUIRING RESET BY PRESSURE EQUALIZATION
Filed Jan. 13, 1960 3 Sheets-Sheet 2

INVENTOR
Asa D. Sands
BY
ATTORNEYS

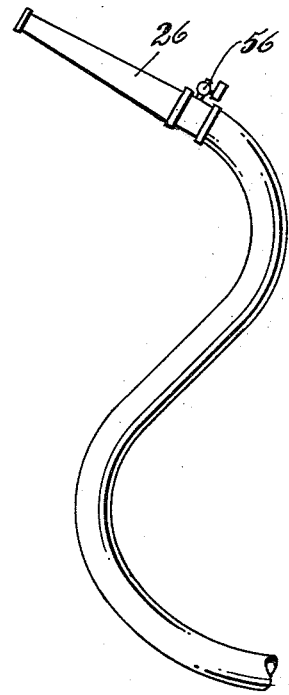
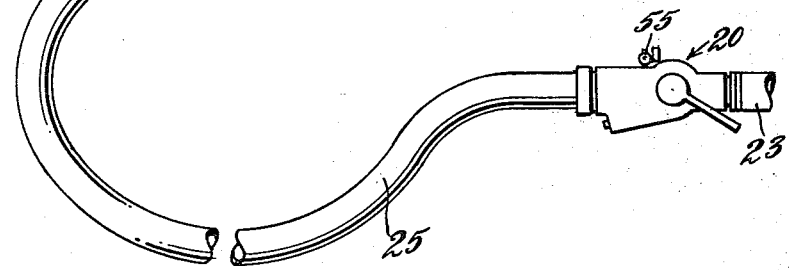
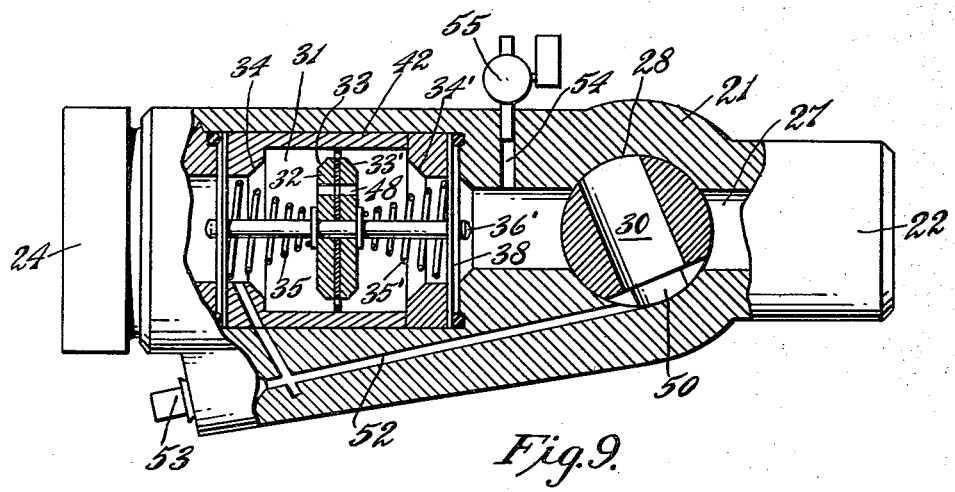

United States Patent Office 3,106,937
Patented Oct. 15, 1963

3,106,937
SAFETY CUT-OFF VALVE REQUIRING RESET
BY PRESSURE EQUALIZATION
Asa Dewitt Sands, 3606 Federal St., Camden 5, N.J.
Filed Jan. 13, 1960, Ser. No. 2,162
2 Claims. (Cl. 137—613)

The present invention relates to safety valves of the character which may be used in connection with hoses and the like to protect against injury to personnel and to restore operation after accidents such as bursting of hoses.

A purpose of the invention is to reduce the danger of injury to fire department personnel in case of bursting of a fire hose.

A further purpose is to more rapidly restore operation of a fire hose when a hose portion is replaced after an accident due to bursting of a hose.

A further purpose is to eliminate the delay in restoring operation of a fire hose due to air binding.

A further purpose is to eliminate the difficulty frequently encountered in air hoses and the like due to the presence of water.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a side elevation of a preferred embodiment of the valve of the invention.

FIGURE 2 is a section on the line 2—2 of FIGURE 1, showing the safety valve open and the plug valve in priming position.

FIGURE 3 is a section on the line 3—3 of FIGURE 2.

FIGURE 4 is a fragmentary section on the line 4—4 of FIGURE 2.

FIGURE 8 is a fragmentary side elevation of an assembly of the valve of the invention connected to a fire hose and nozzle.

FIGURE 9 is a modified form of the valve of the invention shown in a section similar to FIGURE 2.

Figure 5:
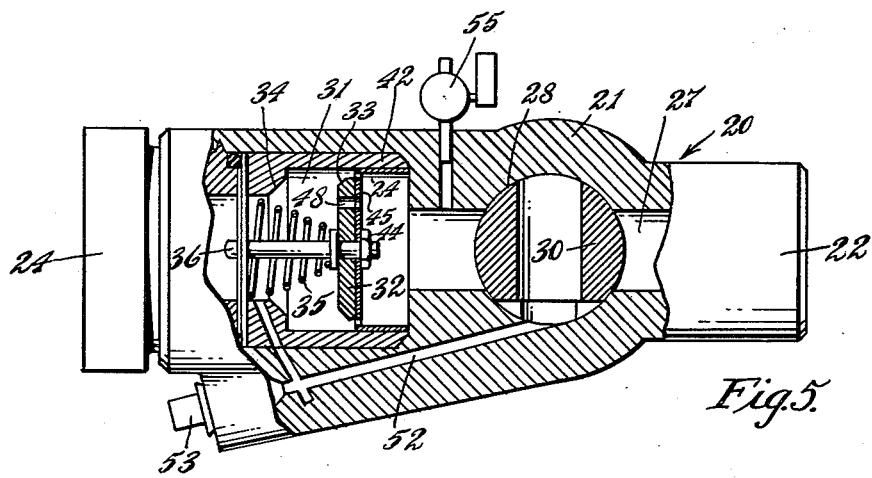
FIGURE 5 is a view similar to FIGURE 2 showing the plug valve in cut-off position.

Considerable difficulty has been encountered due to bursting of fire hoses and other hoses. This is particularly troublesome in the case of a fire hose because the burst hose develops lateral force or jet components which may arise unexpectedly at any point and can cause serious accidents by throwing firemen from roofs, cornices and ladders.

The invention is also applicable to protection of personnel using air tools and the like against injury by bursting and whipping of air hoses and also hoses containing other gases.

The invention provides not only for the protection of the personnel, but also for increased speed in restoration of normal operation after the broken hose is replaced.

I illustrate in FIGURES 1 to 7 a valve 20 having a housing 21 which is provided with an inlet connection 22 suitably from an inlet hose which in the case of a fire hose may be a hose 23 (FIGURE 8) connected to a pumping engine, or to a fire plug in the case of a high pressure fire line. At the opposite end the housing has an outlet connection 24 which may be connected to a discharge hose and in the case of a fire hose will normally be connected to a hose 25 which at the discharge end has a nozzle 26 playing water on the fire.

Between the inlet and outlet in the housing is a passage 27 which is provided first with a socket 28 for a plug valve 30 and then with a chamber 31 for a safety valve 32. The safety valve has at the forward end a seat engaging tapered portion 33 which in closed position engages against a seat 34 at the forward end of the safety valve chamber. The safety valve 33 is spring biased toward open position by a converging helical compression spring 35 acting around a valve guiding stem 36 which extends through an opening 37 in a spider 38 which is seated against packing 40 between portions of the valve housing threaded together at 41 and a removable chamber insert 42.

The helical compression spring 35 rests at one end against the spider 38 and at the other end against a boss 43 on the valve stem 36, the stem being secured to the valve by a nut 44.

Also held by the nut 44 is an apron 45 which in open position has flanges 46 resting against the rearward end of the valve chamber. The apron is provided with ports 47 permitting fluid flow in open position.

In order to equalize pressure between the two sides of the valve when the safety valve closes, the safety valve and the apron have an equalizing port 48 which extends therethrough.

Figure 6:
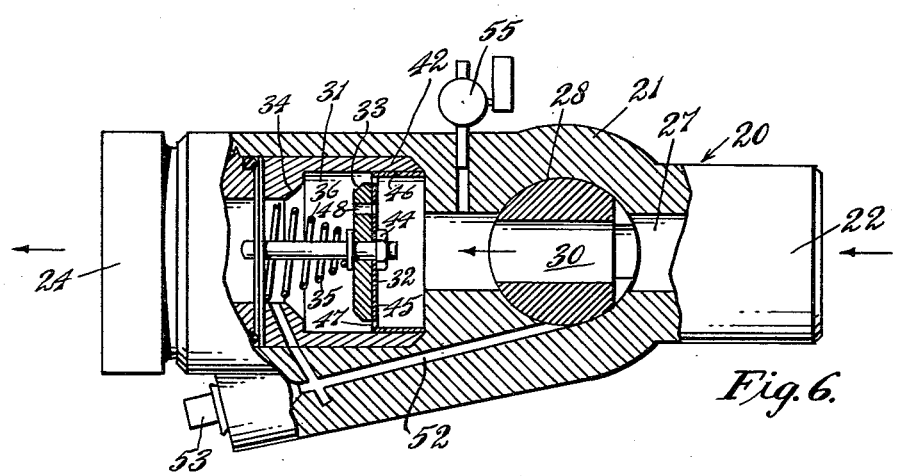
FIGURE 6 is a view similar to FIGURE 2 showing the plug valve in open position and the safety valve open.

The plug valve has a closed position as shown in FIGURE 5 and an open position in FIGURE 6.

The plug valve also has an auxiliary port 50 which when the plug valve handle 51 is turned to an angular position cuts off the main flow through the passage 27 but connects with a primer port 52 which discharges into the passage 31 between the seat 34 and the outlet connection 24.

The primer passage also desirably extends to a low level when the valve is in the position shown in FIGURE 2 and has a removable screw plug 53 through which water can be removed in the case of an air line.

Connecting with the passage 27 between the plug valve and the safety valve there is a passage 54 having an air removing cock 55 which removes air binding.

Connecting with the nozzle 26 before the water enters the nozzle throat there is a cock 56 which can be opened also to remove air binding.

Figure 7:
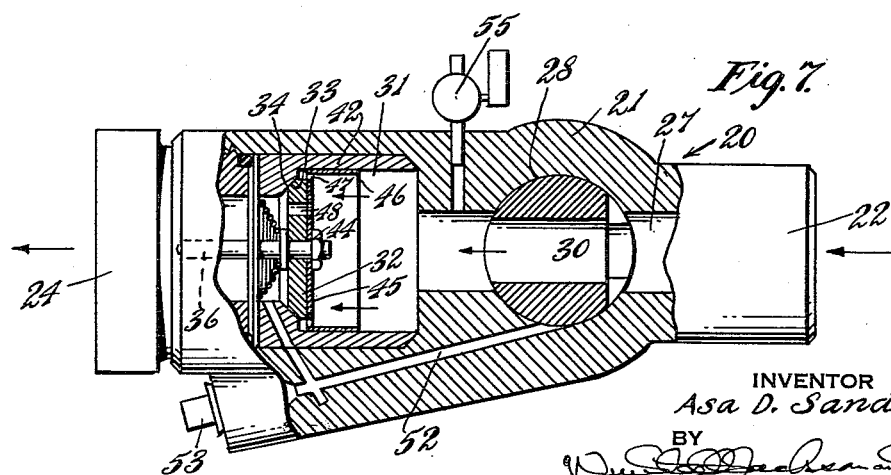
FIGURE 7 is a view similar to FIGURE 2 showing the plug valve open and the safety valve closed.

In operation, when the fire hose is functioning normally, the valve will be in the position of FIGURE 6 with the safety valve open and the plug valve open. If the hose bursts beyond the valve 20, the safety valve closes under the high pressure differential as shown in FIGURE 7. The nearest fireman can then turn off the burst hose by turning the plug valve to the position of FIGURE 5.

The burst hose is then replaced. Considerable delay will be encountered while pressure equalizes through the port 48, in the safety valve if the plug valve is simply opened.

Instead the plug valve is then turned to the position of FIGURE 2, which allows a considerable quantity of extra flow of water around the safety valve and equalizes pressure quickly so that the safety valve will open, then the plug valve is turned to the open position, as shown in FIGURE 6.

As a result the accident of a burst hose can occur without injury to a fireman. Often, however, when the hose is extending up to a considerable height on a ladder or building there may be considerable delay in restoring service due to air binding. This can be overcome by a fireman near the valve opening the air cock 55 until water discharges and then closing it. Similarly, if air binding occurs near the nozzle, the fireman holding the nozzle can open air binding cock 56 and then close it when water discharges.

Where the invention is used on an air line instead of a fire hose, the primer connection 52 is desirably used to eliminate water which may collect in the hose. This is accomplished by shifting the valve to the position of FIGURE 2 and removing the plug 53 until water has been eliminated.

In some cases unforeseen accidents at the discharge end of a hose create vibratory effects which instead of causing a safety valve to seat at the forward end may cause the safety valve to seat at the end adjoining the source. This is especially true where equipment near the end of the hose may explode. For service of this character, the safety valve chamber is provided with an extra valve seat 34' and an extra valve surface 33' at the opposite end and an extra stem 36' and extra spider 38 and an extra helical compression spring 35' all as shown in FIGURE 9. The safety valve is then poised at a mid-position under the action of the two opposed springs.

This will operate similarly to the valve already described except that in case higher pressure exists at the discharge end, the safety valve will close toward the source, whereas if the higher pressure is toward the source the safety valve will close in case of an accident toward the discharge end.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a safety valve, a housing having an inlet fluid connection at one end, an outlet fluid connection at the other end and a passage extending between the inlet and outlet fluid connections, a safety valve chamber in the passage having a safety valve seat at the end of the chamber toward the outlet connection, a safety valve in the chamber adapted in closed position to close against the seat, spring means biasing the safety valve toward open position, a leakage port between opposite sides of the safety valve remaining open when the safety valve is closed, a plug valve in the housing between the inlet connection and the safety valve chamber, having a closed position which closes flow through the passage and an open position which opens flow through the passage and having a primer position, and a primer port connected from the passage adjacent the inlet connection through the plug valve in the primer position to the passage adjacent the outlet connection beyond the seat of the safety valve.

2. A valve of claim 1, in combination with an air release valve connected to the passage in the space between the plug valve and the safety valve seat.

References Cited in the file of this patent

UNITED STATES PATENTS

| | | |
|---|---|---|
| 1,186,147 | Syakas | June 6, 1916 |
| 1,599,592 | Sladden | Sept. 14, 1926 |
| 1,956,010 | Diescher | Apr. 24, 1934 |
| 2,071,969 | Diescher | Feb. 23, 1937 |
| 2,271,535 | Barker | Feb. 3, 1942 |
| 2,357,321 | Fuller | Sept. 5, 1944 |
| 2,364,848 | Hurst | Dec. 12, 1944 |
| 2,451,828 | Herriott | Oct. 19, 1948 |
| 2,726,898 | Henriksson | Dec. 13, 1955 |
| 2,750,956 | Stevenson | June 19, 1956 |
| 2,917,077 | Ziege | Dec. 15, 1959 |
| 2,926,690 | Martin | Mar. 1, 1960 |